May 25, 1965   C. J. COBERLY   3,185,517
APPARATUS FOR SIMULTANEOUSLY RUNNING MULTIPLE TUBING STRINGS
Filed May 16, 1961   5 Sheets-Sheet 1

INVENTOR
CLARENCE J. COBERLY
BY HIS ATTORNEYS
HARRIS, KIECH, RUSSELL & KERN

May 25, 1965  C. J. COBERLY  3,185,517
APPARATUS FOR SIMULTANEOUSLY RUNNING MULTIPLE TUBING STRINGS
Filed May 16, 1961  5 Sheets-Sheet 2
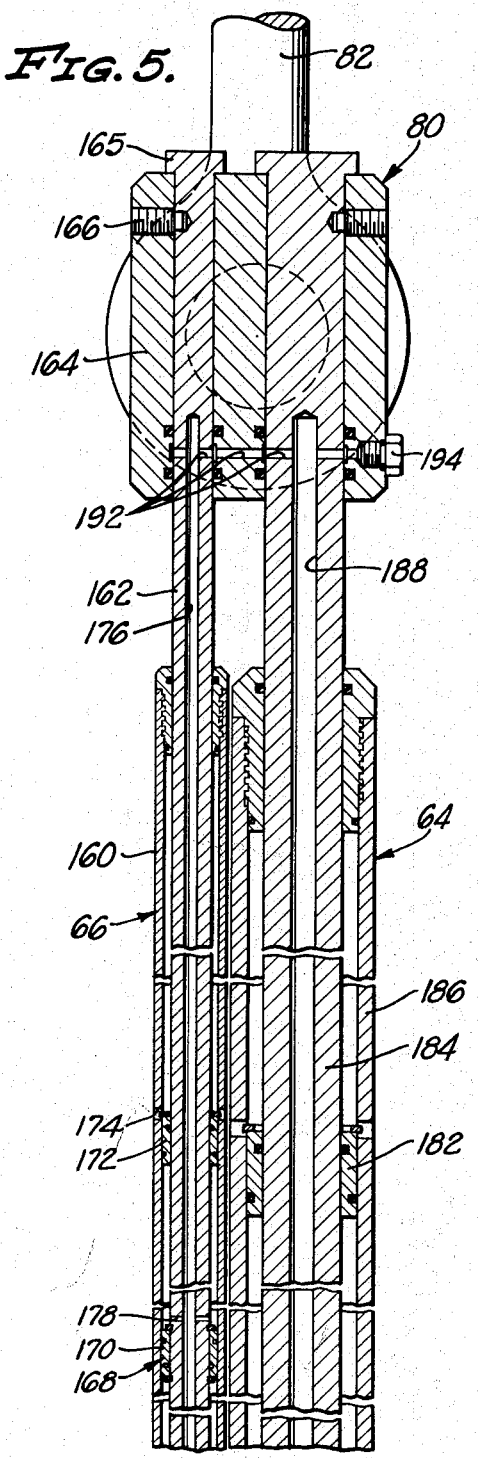
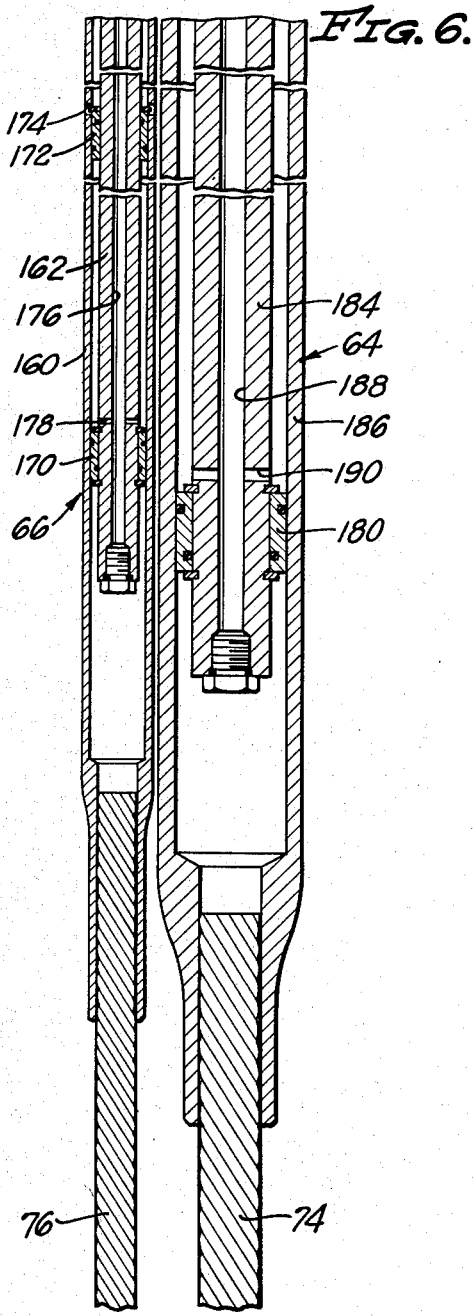
INVENTOR
CLARENCE J. COBERLY
BY HIS ATTORNEYS
HARRIS, KIECH, RUSSELL & KERN

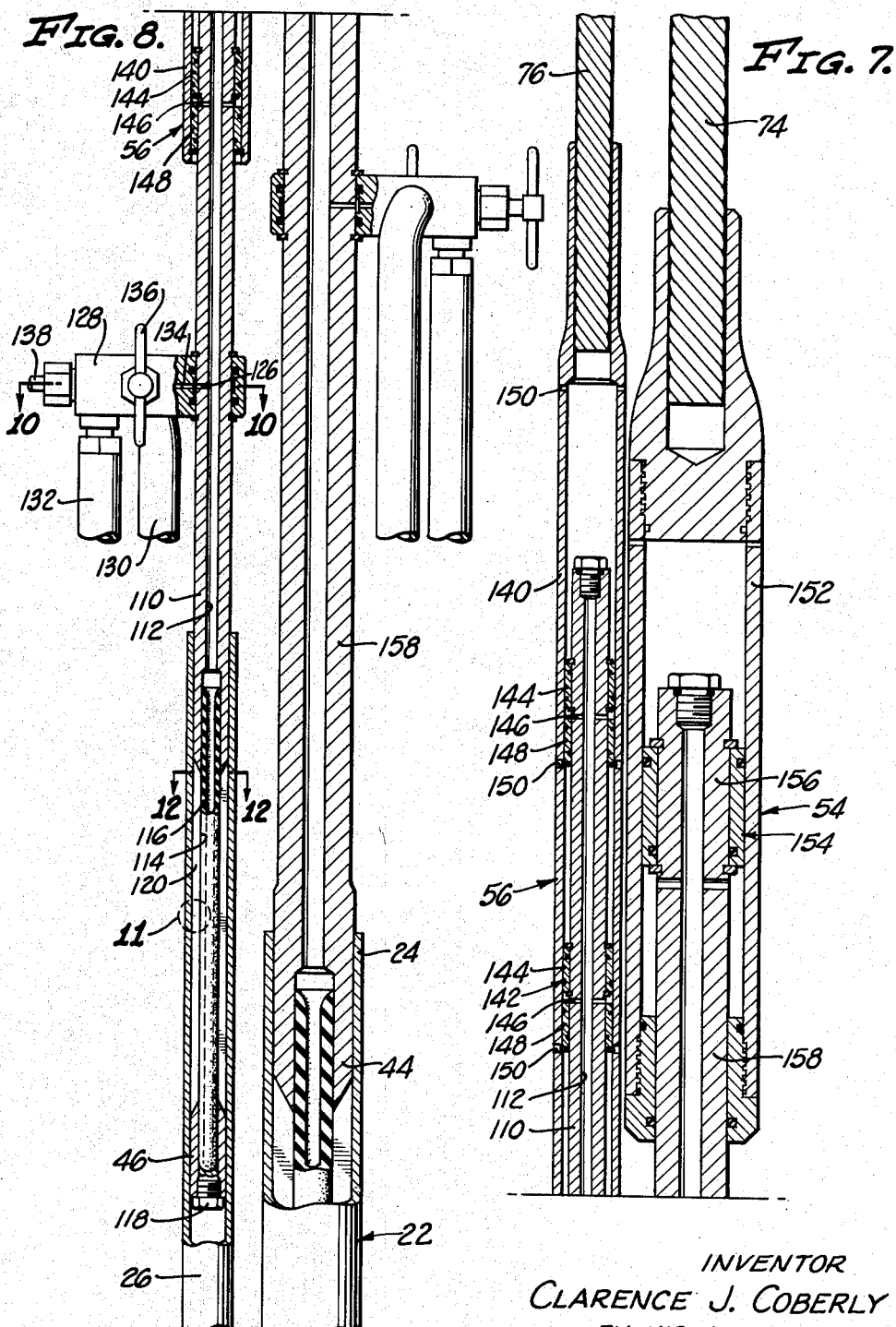

May 25, 1965  C. J. COBERLY  3,185,517
APPARATUS FOR SIMULTANEOUSLY RUNNING MULTIPLE TUBING STRINGS
Filed May 16, 1961  5 Sheets-Sheet 4
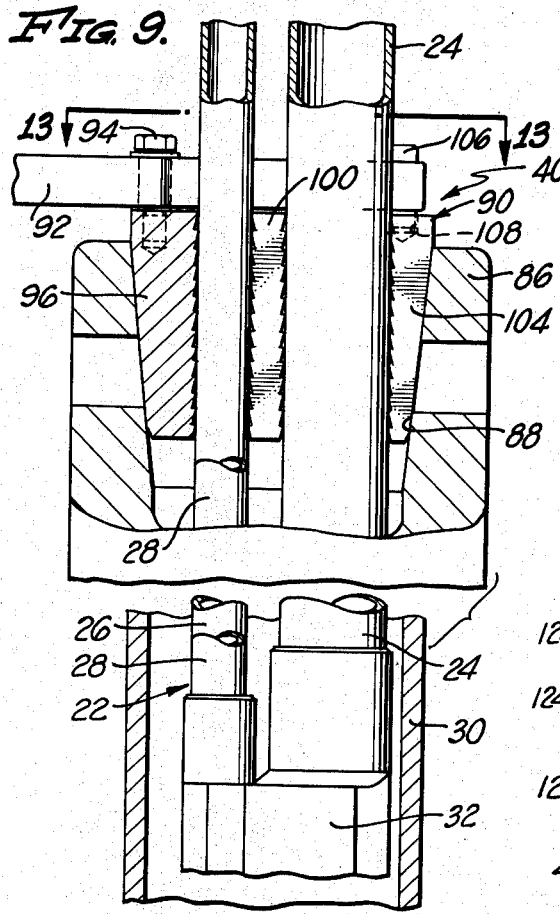
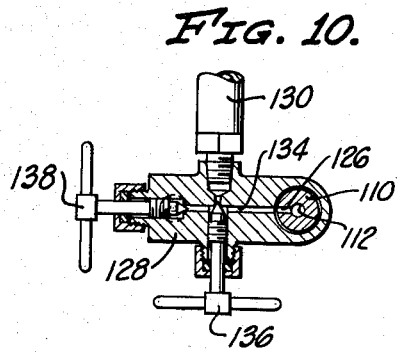
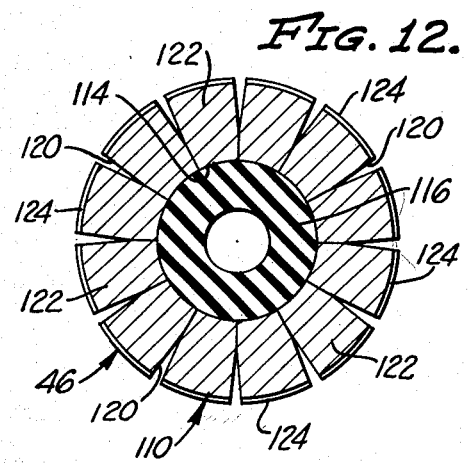
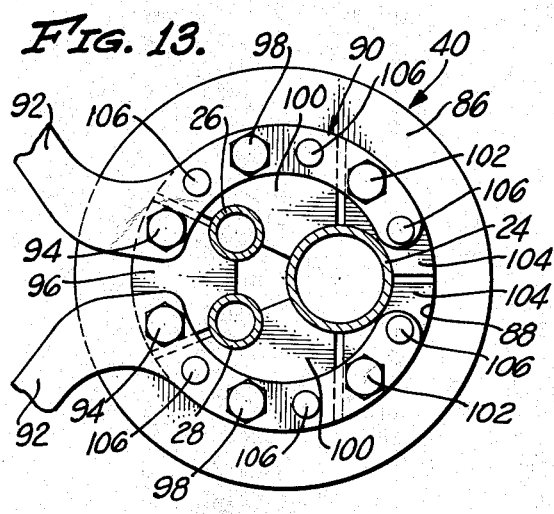
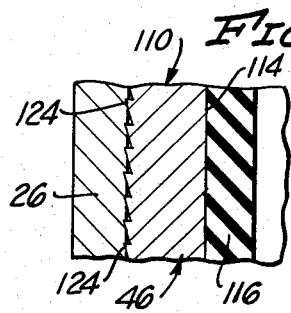
INVENTOR
CLARENCE J. COBERLY
BY HIS ATTORNEYS
HARRIS, KIECH, RUSSELL & KERN May 25, 1965
C. J. COBERLY
3,185,517
APPARATUS FOR SIMULTANEOUSLY RUNNING MULTIPLE TUBING STRINGS
Filed May 16, 1961
5 Sheets-Sheet 5
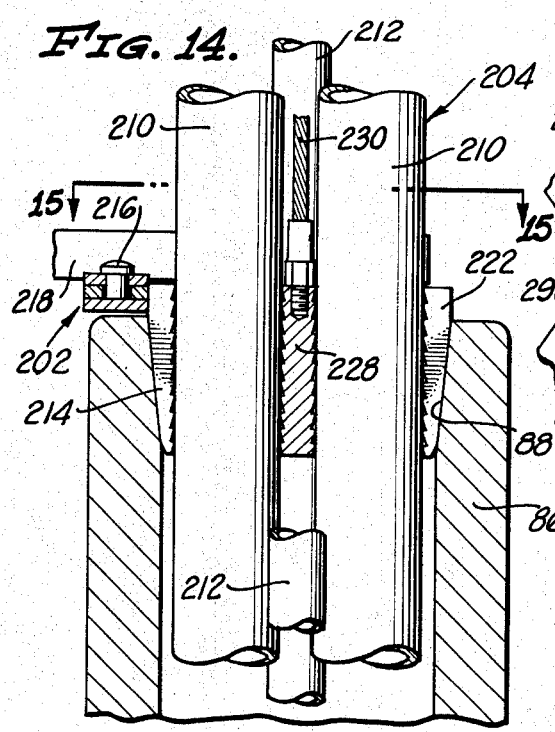
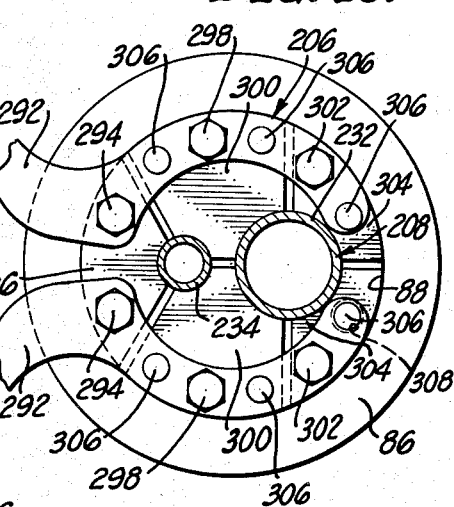
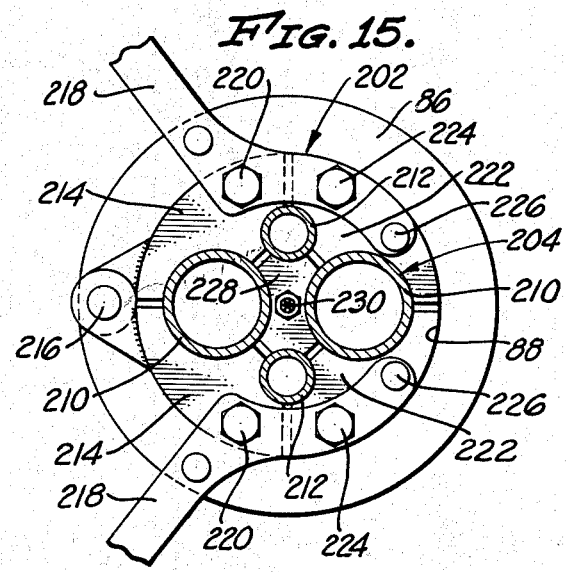
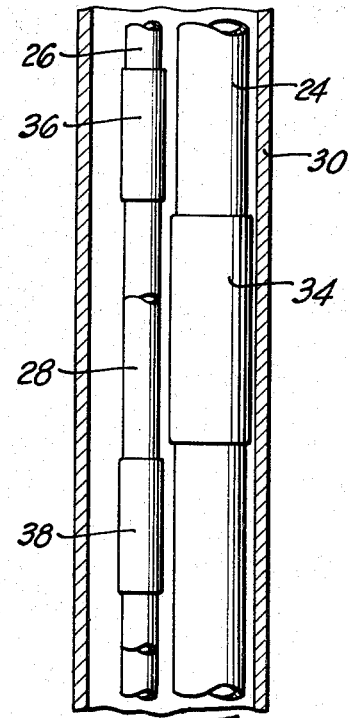
INVENTOR
CLARENCE J. COBERLY
BY HIS ATTORNEYS
HARRIS KIECH, RUSSELL & KERN United States Patent Office 3,185,517
Patented May 25, 1965

3,185,517
APPARATUS FOR SIMULTANEOUSLY RUNNING
MULTIPLE TUBING STRINGS
Clarence J. Coberly, San Marino, Calif., assignor to Kobe, Inc., Huntington Park, Calif., a corporation of California
Filed May 16, 1961, Ser. No. 110,555
6 Claims. (Cl. 294—87)

The present invention relates in general to running multiple-string tubing systems, such as oil well tubing systems used in conjunction with fluid operated pumps and comprising two or more tubing strings which are interconnected at their lower ends, as by a bottom shoe. The invention is particularly applicable to a tubing system comprising parallel tubing strings, i.e., tubing strings disposed in side-by-side relation, and will be considered in such connection herein for convenience.

One prior way of running parallel tubing strings into an oil well is to first run in the largest string with a bottom shoe connected to the lower end thereof. A smaller tubing string is then run in and the lower end thereof is stabbed into a suitable socket in the bottom shoe, this process then being repeated for any additional tubing string or strings which may be used. Running tubing strings sequentially in this manner presents problems, particularly where the lateral dimensions of the tubing system are large as compared to the well diameter, as is the case where the well casing is small, or where the tubing strings are large in diameter and/or number. One problem encountered is the tendency of the couplings of a subsequently run tubing string or strings to hang up on the couplings of a previously run tubing string or strings. To minimize the chances of hanging up, it is necessary to provide tapered shoulders at the ends of the couplings.

Because of the difficulties encountered with the foregoing prior practice and despite the fact that running tubing strings simultaneously presents other problems, the most prevalent prior procedure in running tubing systems is to run all of the tubing strings at the same time, clamping the smaller tubing string or strings to the largest and using the largest to carry the entire weight of the tubing system. With this more conventional prior practice, requiring thel argest tubing string to support the entire load has obvious disadvantages. For example, it is impossible to run such a tubing system to as great a depth as a single tubing string.

The primary object of the present invention is to obviate the difficulties encountered with the foregoing prior practices by running the tubing strings of a multiple-string tubing system simultaneously in such a manner that each tubing string supports its proportionate share of the total load. More particularly, the primary object of the invention is to provide an apparatus for simultaneously running tubing strings while maintaining the tensile stresses therein substantially equal so that no one tubing string is required to carry more than its proportionate share of the total weight.

An important object is to provide an apparatus of the foregoing nature which results in closely spaced tubing strings so as to minimize the lateral dimensions of the system. With this construction, more and/or larger tubing strings can be run into a casing of given size, which is an important feature.

Another object of the invention is to provide an apparatus for installing multiple tubing strings interconnected at their lower ends which involves individually gripping the tubing strings adjacent their upper ends and applying to the respective tubing strings upward forces related in a predetermined manner, such upward forces being proportional to the respective weights of the tubing strings, and preferably being substantially equal to the respective weights of the tubing strings so as to produce substantially equal tensile stresses therein.

Still another object of the invention is to provide hydraulic or other tubing grips individually engageable with the tubing strings adjacent the upper ends thereof, and means connected to the tubing grips for applying thereto upward forces related in the desired predetermined manner. Another object in this connection is to provide slip means engageable with the tubing strings below the upper ends thereof for supporting same when the tubing grips are disengaged.

An important object is to provide means for distributing the weight of the tubing system among or between the individual tubing strings which is hydraulically operated and which includes hydraulic units connected to the respective tubing grips and comprising cylinders provided with pistons having effective areas with the desired predetermined relation therebetween, the cylinders being interconnected so that the effective areas of the pistons are subjected to the same fluid pressure.

Another object is to provide a hydraulic load distributing means of the foregoing nature wherein the hydraulic units are connected to a suitable suspension means in a detachable manner so as to permit substituting other hydraulic units to change the predetermined relation between the effective areas of the pistons thereof, thereby changing the division of the total weight of the tubing system between or among the individual tubing strings. With this construction, hydraulic-unit substitutions may be made to compensate for different tubing string sizes, materials, and the like.

Yet another object of the invention is to provide a hydraulic unit of the foregoing nature the piston of which includes two or more piston elements structurally connected in tandem and provided with areas hydraulically connected in parallel. With this construction, a hydraulic unit of minimum diameter may be utilized to permit achieving the desired close spacing of the tubing strings without going to excessively high fluid pressures, which is an important feature.

A further important object of the invention is to provide an internal tubing grip which is axially insertable into one end of a tubing string and which is radially expansible into gripping engagement with the inner surface of the tubing string. The provision of such an internal tubing grip makes it possible to closely space the set of tubing grips used to achieve the desired close spacing of the tubing strings themselves, which is an important feature.

Another object of the invention is to provide an internal, radially expansible tubing grip which is set by applying thereto an axial pull force tending to withdraw it from the tubing string.

An important object in the foregoing connection is to provide means for simultaneously radially expanding and axially tensioning the tubing grip in a proportional manner so as to proportionately relate the radial gripping force applied to the tubing string by the tubing grip and the axial pull force applied to the tubing grip, the latter being dependent on the load to be carried by the tubing string.

A further object is to provide hydraulic means for radially expanding the tubing grip, hydraulic means for axially tensioning the tubing grip, and means for applying the same fluid pressure simultaneously to both of these hydraulic means.

Still another object of the invention is to provide an internal tubing grip having radially expansible, circumferentially arranged jaws and having an expansible boot which is located between such jaws in engagement therewith and into which fluid under pressure may be introduced to expand the jaws. Other objects in this connection include the provision of jaws which are integrally interconnected at the respective ends of the tubing grip, and which are at least substantially in contact in the circumferential direction adjacent the boot to prevent radially outward extrusion of the boot between the jaws upon the introduction of a fluid under pressure into the boot.

Yet another object of the invention is to provide hydraulic tubing-grip tensioning means which includes a cylinder having therein a piston comprising piston elements structurally connected in tandem and provided with areas hydraulically connected in parallel. Again, this construction provides a minimum diameter, without the use of extremely high fluid pressures, to permit closely spacing the tubing strings.

The foregoing objects, advantages, features and results of the present invention, together with various other objects, advantages, features and results thereof which will be evident to those skilled in the art of running multiple tubing strings in the light of this disclosure, may be achieved with the exemplary embodiments of the invention described in detail hereinafter and illustrated in the accompanying drawings, in which:

FIG. 1 is a semidiagrammatic view of an apparatus of the invention partially in vertical section and partially in elevation;

FIGS. 2, 3 and 4 are enlarged, horizontal sectional views taken along the arrowed lines 2—2, 3—3 and 4—4, respectively, of FIG. 1;

FIG. 5 is a vertical sectional view taken along the irregular arrowed lines 5—5 of FIGS. 2 and 3;

FIG. 6 is a downward continuation of FIG. 5;

FIG. 7 is a downward continuation of FIG. 6 and is taken as indicated by the arrowed line 7—7 of FIG. 4;

FIG. 8 is a downward continuation of FIG. 7;

FIG. 9 is a downward continuation of FIG. 8;

FIG. 10 is a sectional view taken along the arrowed line 10—10 of FIG. 8;

FIG. 11 is an enlarged sectional view duplicating the circled portion 11 of FIG. 8;

FIG. 12 is an enlarged, fragmentary sectional view taken along the arrowed line 12—12 of FIG. 8;

FIG. 13 is a horizontal sectional view taken along the arrowed line 13—13 of FIG. 9;

FIG. 14 is a vertical sectional view of an alternative slip means of the invention;

FIG. 15 is a horizontal sectional view taken along the arrowed line 15—15 of FIG. 14;

FIG. 16 is a plan view of still another embodiment of the slip means of the invention; and FIG. 17 is a fragmentary vertical sectional view showing tubing strings having vertically staggered couplings interconnecting sections thereof.

Figure 1:
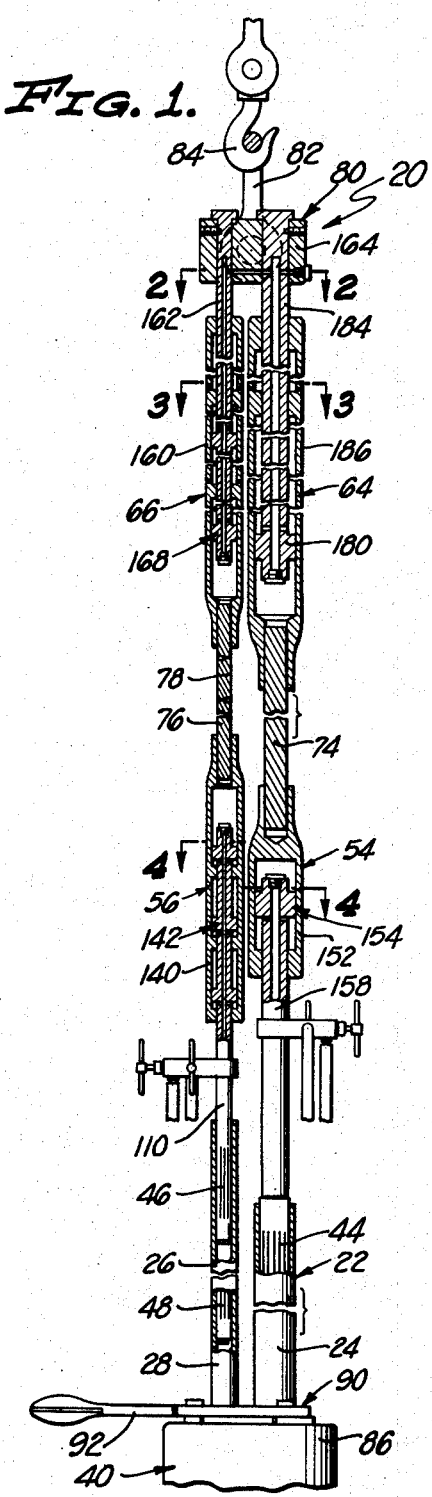

Referring initially to FIG. 1 of the drawings, the tubing running apparatus of the invention is designated generally therein by the numeral 20 and, in the particular construction illustrated, is adapted to run a tubing system 22 composed of three parallel tubing strings 24, 26 and 28, into or out of a well having a casing 30, FIGS. 9 and 17. The tubing strings 24, 26 and 28 are interconnected at their lower ends, as by connecting them to a bottom shoe 32, FIG. 9, adapted to receive therein a fluid operated pump, not shown. In accordance with the invention, the tubing strings 24, 26 and 28 are closely spaced to utilize with maximum efficiency the space available within the casing 30. In order to minimize the spacings between the tubing strings 24, 26 and 28, couplings 34, 36 and 38, FIG. 17, utilized to interconnect the sections of the respective tubing strings, are vertically staggered and may even overlap in the horizontal direction. The couplings 34, 36 and 38 may be of any suitable type. For example, they may be ordinary threaded external couplings, or they may be internal or external couplings utilizing a hydraulic shrink fit, as disclosed in copending patent application Serial No. 104,564, filed April 21, 1961 by Francis Barton Brown and me, this patent application now being Patent No. 3,114,566, issued December 17, 1963. The latter are preferred since they further minimize the lateral dimensions of the tubing system 22 to permit more and/or larger tubing strings in a given casing size.

Considering the apparatus 20 in a general way with principal reference to FIG. 1 of the drawings, it includes a tubing head having slip means 40 for supporting that portion of the tubing system 22 which is in the well while tubing string sections are being coupled onto or uncoupled from the tubing strings 24, 26 and 28.

The apparatus 20 also includes independent tubing gripping units respectively including tubing grips 44, 46 and 48 respectively engageable with the upper ends of the tubing strings 24, 26 and 28. Connected to the upper ends of the respective tubing grips 44, 46 and 48, and forming parts of the respective tubing gripping units, are hydraulic setting units 54, 56 and 58 for setting the respective tubing grips under tension loads.

The hydraulic setting units 54, 56 and 58 are flexibly connected at their upper ends to the lower ends of hydraulic weight distributing units 64, 66 and 68 which constitute means for distributing the weight of the tubing system 22 among the tubing strings 24, 26 and 28 in a predetermined manner. The flexible connections between the hydraulic units 54, 56 and 58 and the hydraulic units 64, 66 and 68, which may comprise wire lines 74, 76 and 78 respectively, permit individual handling of the tubing grips 44, 46 and 48 to facilitate engaging same with and disengaging same from the respective tubing strings 24, 26 and 28.

The load distributing or proportioning hydraulic units 64, 66 and 68 are supported by a traveling suspension means 80 which is provided with a bail 82 engageable by a hook 84. The latter may be carried by a conventional traveling block, not shown, suspended by a cable system from a crown block of a suitable derrick.

Considering the slip means 40 with reference to FIGS. 9 and 13 of the drawings, it includes a tubular head 86 suitably mounted on the upper end of the casing 30 and provided therein with a tapered annular seat 88 for a slip assembly 90 engageable with the tubing strings 24, 26 and 28. The slip assembly 90 is provided with two handles 92 respectively connected by pivots 94 to a slip 96 which is engageable with the tubing strings 26 and 28. Connected to the handles 92 by pivots 98 are slips 100 one engageable with the tubing strings 24 and 26 and the other engageable with the tubing strings 24 and 28. Also connected to the handles 92, by pivots 102, are slips 104 both engageable with the tubing string 24 on the opposite side thereof from the slips 100. Pivoting of the slips 100 and 104 relative to the handles 92 about the axes of the respective pivots 98 and 102 is limited by pins 106 carried by the handles and extending into enlarged holes 108 in the corresponding slips, as best shown in FIG. 9. The pins 106 provide enough freedom of motion for the slips 100 and 104 to permit them to engage the tubing strings 24, 26 and 28 properly. The slips 96, 100 and 104 have tapered external surfaces complementary to and engageable with the tapered seat 88 to cause the slips to engage the tubing strings 24, 26 and 28 properly under the influence of the weight of the tubing system 22.

In order to release the slip means 40, the weight of the tubing system 22 is first removed from the slips 96, 100 and 104 by the tubing grips 44, 46 and 48 in a manner which will be described. The slip assembly 90 may then be lifted out of the tapered seat 88 by means of the handles 92, and the slips 96, 100 and 104 may then be disengaged from the tubing strings 24, 26 and 28 by pivoting the outer ends of the handles 92 toward each other about the axes of the pivots 94. This pivots the inner ends of the handles 92 away from each other, about the axes of the pivots 94, to disengage the slips 100 from the tubing strings 24, 26 and 28 and to disengage the slips 104 from the tubing string 24, the action being much the same as that of disengaging a pair of pliers from an article held thereby. The slip assembly 90 may then be laterally withdrawn to a position clear of the tubing system 22. The procedure in applying the slip assembly 90 to the tubing system, and in setting the slip means 40, is essentially the reverse of the foregoing.

Considering the grips 44, 46 and 48 for the tubing strings 24, 26 and 28, these are expansible grips which are axially insertable into the tubing strings so as to minimize the spacing between the tubing strings, which is an important feature. The tubing grips 44, 46 and 48 are all similar and, accordingly, only one of them, viz., the tubing grip 46, will be considered in detail.

As shown in FIG. 8 of the drawings, the tubing grip 46 includes a rod 110 provided with an axial passage 112 therethrough and provided adjacent its lower end with a counterbore 114 containing an expansible, elastomeric boot or liner 116, the lower end of the counterbore 114 being closed by a plug 118. The counterbored portion of the rod 110 is provided with a plurality of circumferentially spaced, longitudinal slits 120 the lengths of which are somewhat less than the length of the boot 116 so that the boot extends beyond the ends of such slits. The inner edges of the slits 120 are closed, or substantially closed, to prevent extrusion of the boot 116 radially outwardly thereinto upon the application of internal fluid pressure to the boot in a manner to be described. The slits 120 may be formed by milling longitudinal slots in the rod 110 and then swaging the inner edges of the slits closed, or substantially closed.

The slits 120 render the slitted portion of the rod 110 radially expansible and provide therebetween radially expansible jaws 122 engageable with the inner surface of the tubing string 26. The slitted portion of the rod 110 is provided with shallow circumferential serrations which, in effect, provide the jaws 122 with circumferentially extending teeth 124 adapted to bite into the inner surface of the tubing string 26, as best shown in FIG. 11 of the drawings. The teeth 124 have a radial extent of only a few thousandths of an inch so that the practical effect thereof is to provide a high coefficient of friction between the jaws 122 and the inner surface of the tubing string 26.

As will be apparent, when fluid under pressure is introduced into the boot 116 through the axial passage 112 in the rod 110, the boot is radially expanded to displace the jaws 122 radially outwardly into engagement with the internal surface of the tubing string 26. As shown in FIG. 8, fluid under pressure is introduced into the axial passage 112 through a radial port 126 communicating with a fitting 128 secured to the rod 110. Referring to FIGS. 8 and 10 of the drawings, the fitting 128 has connected thereto flexible fluid supply and return lines 130 and 132 of sufficient length to reach to the points where the tubing grip 46 is to be inserted into the tubing string 26, or into a section to be added thereto. If desired, the fluid lines 130 and 132 may be of sufficient length to accommodate the vertical movement of the traveling suspension means 80 which is necessary to accommodate the lengths of the tubing string sections employed. The supply line 130 is connected to a suitable source of fluid under pressure and the return line 132 is connected to a suitable point of disposal, such as a reservoir associated with the source. This structure is not shown in the drawings since it may be of any suitable type.

The fitting 128 is provided therein with a passage 134 which communicates with the radial port 126 in the rod 110 and which also communicates with the supply and return lines 130 and 132 through supply and return valves 136 and 138. By closing the return valve 138 and opening the supply valve 136, fluid under pressure is delivered to the axial passage 112 in the rod 110 to energize the tubing grip 46. As will be explained, the supply valve 136 is opened only momentarily and is then closed to trap the injected fluid. This tubing grip may be de-energized by closing the supply valve 136 and opening the return valve 138.

As previously indicated, the structure and mode of operation of the tubing grip 44, and the structure and mode of operation of the tubing grip 48 for the tubing string 28, are similar to those of the tubing grip 46. Consequently, a further description is not necessary.

Turning to FIGS. 7 and 8 of the drawings, the hydraulic unit 56 connected to the tubing grip 46 includes a cylinder 140 the upper end of which is supported by the wire line 76. Within the cylinder 140 is a piston or piston means 142 to which the same fluid pressure that acts on the tubing grip 46 is applied to axially tension the tubing grip 46 in a direction to tend to withdraw it from the corresponding tubing string 26. As will be explained, the effective area of the piston means 142 is proportional to the weight to be carried by the tubing grip 46, the supported weight building up the pressure in the trapped fluid in the tubing grip 46 and the hydraulic unit 56 to the value necessary to support such weight. With this construction, the tubing grip 46 is set by applying a pull or tension force thereto which is proportional to the load to be carried by the tubing grip 46. Thus, the gripping force exerted by the tubing grip 46 is directly proportional to the load to be carried thereby, which is an important feature.

Considering the hydraulic unit 56 in more detail, the piston means 142 includes a plurality, e.g., three, piston elements 144 which are structurally connected in tandem and hydraulically connected in parallel to achieve the desired effective area with as small a diameter as possible and without the use of an excessively high fluid pressure, the small diameter permitting closer spacing of the tubing strings 24, 26 and 28. More particularly, the piston elements 144 are suitably fixed on the rod 110 within the cylinder 140 and the lower ends of the piston elements are exposed to the fluid pressure in the axial passage 112 through radial ports 146. Suitably fixed within the cylinder 140 below the respective piston elements 144 are reaction elements 148 to the upper ends of which the fluid pressure in the axial passage 112 is applied through the radial ports 146. The upper ends of the piston elements 144 are exposed to atmospheric pressure through radial ports 150 in the cylinder 140.

With the foregoing construction, it will be seen that the effective area of the piston means 142 is the sum of the areas of the lower ends of the piston elements 144. Thus, the desired effective area for the piston means 142 is obtained in a smaller diameter than would otherwise be possible, which permits closer spacings between the tubing string 26 and the tubing strings 24 and 28.

The hydraulic unit 58 connected to the tubing grip 48 for the tubing string 28 preferably has the same structure as the hydraulic unit 56 since, in the particular construction illustrated, the tubing string 28 is of the same size as the tubing string 26. Since the tubing string 24 is larger than the tubing strings 26 and 28 in the particular construction illustrated, the hydraulic unit 54 may be correspondingly larger than the hydraulic units 56 and 58. Consequently, as shown in FIG. 7 of the drawings, the hydraulic unit 54 is provided with a cylinder 152 and a piston means 154 of larger diameter than the cylinder 140 and the piston means 142. In view of such larger diameter, it is possible in some instances to obtain in the hydraulic unit 54 an effective area for the piston means 154 proportional to the load to be carried by the tubing grip 44, with a single piston element 156 suitably secured to a tubing-grip rod 158 corresponding to the tubing-grip rod 110. (However, multiple piston elements may be used in the hydraulic unit 54 also if necessary to obtain the desired small diameter.) Otherwise, the structure and mode of operation of the hydraulic unit 54 are similar to those of the hydraulic unit 56 so that a further description is not necessary.

It will be noted that when fluid under pressure is injected into and locked in each tubing grip and hydraulic unit combination in the manner hereinbefore described, the respective units 54, 56 and 58 apply to the corresponding tubing grips 44, 46 and 48 tension forces proportional to the respective grip expanding forces, and proportional to the loads carried by the respective tubing grips. The same initial fluid pressure is preferably applied to and locked in all of the tubing grips 44, 46 and 48 and all of the hydraulic units 54, 56 and 58, this initial pressure being sufficient only to set the tubing grips lightly. However, the initial pressure builds up to higher values in the respective bodies of fluid trapped in the respective tubing grip and hydraulic unit combinations as the respective tubing string weights are applied thereto, the pressure in each such trapped body of fluid being proportional to the corresponding load. Thus, the gripping forces developed by the tubing grips are proportional to the respective supported loads.

The downward reaction forces applied to the cylinders of the hydraulic units 54, 56 and 58 are transmitted to the hydraulic units 64, 66 and 68 by the wire lines 74, 76 and 78. The hydraulic units 64, 66 and 68 are so proportioned as to maintain the desired load distribution among the tubing strings 24, 26 and 28 with the same fluid pressure in such units.

It might be well to point out at this juncture that, in a general sense, the hydraulic units 64, 66 and 68 are similar to the hydraulic units 54, 56 and 58, except that the former are always subjected to the same fluid pressure, whereas the latter, in operation, are subjected to fluid pressures proportional to the loads carried by the respective tubing grips 44, 46 and 48. The hydraulic units 64, 66 and 68 are preferably separate from the units 54, 56 and 58 because of the fact that considerable relative vertical movement of the tubing grips 44, 46 and 48 is encountered due to cumulative differences in the lengths of the tubing strings 24, 26 and 28 below the slip means 40, differences in the stretchabilities of the supporting wire lines 74, 76 and 78, diffferences in the lengths of successive tubing string sections added to or subtracted from the tubing strings 24, 26 and 28, differences in the extents to which the tubing grips are stabbed into the tubing strings, and the like. To compensate for factors of this nature in the hydraulic units 54, 56 and 58 themselves would require interconnecting these units in fluid communication and would require long strokes for these units, which would make the units too long to handle conveniently in stabbing the tubing grips into, and in withdrawing them from, the tubing sections 24, 26 and 28. Consequently, the hydraulic units 54, 56 and 58 are provided with relatively short strokes (sufficient only to compensate for such things as possible fluid leakage and variations in grip expansion due to wear and tubing diameter variations), and the necessary stroke lengths to compensate for factors of the nature previously outlined are built into the separate hydraulic units 64, 66 and 68 to avoid making unwieldy the hydraulic units 54, 56 and 58 and the tubing grips associated therewith.

The three hydraulic units 64, 66 and 68 are all similar both as to structure and mode of operation and, therefore, only one of them, viz., the hydraulic unit 66, will be considered in detail.

Referring to FIGS. 5 and 6 of the drawings, the hydraulic unit 66 includes a cylinder 160 the lower end of which is connected to the upper end of the corresponding wire line 76. Extending downwardly into the upper end of the cylinder 160 is a piston rod 162 the upper end of which extends upwardly through a block 164 constituting the traveling suspension means 80. A head 165 on the upper end of the piston rod 162 is seated on the upper surface of the block 164 to support the piston rod, upward movement of the latter being prevented by a set screw 166. If desired, the head 165 may be replaced by a nut, not shown, threaded onto the piston rod 162 above and engageable with the upper surface of the block 164, and the set screw 166 may be replaced by another nut threaded on the piston rod below and engageable with the lower surface of the block 164.

The piston rod 162 is provided thereon within the cylinder 160 with a piston means 168 having an effective area proportional to the tension to be maintained in the corresponding tubing string 26. As in the case of the hydraulic unit 56, the piston means 168 preferably includes piston elements 170 structurally connected in tandem and hydraulically connected in parallel. More particularly, the piston elements 170 are suitably secured to the piston rod 162 and respectively cooperate with piston elements 172 secured to the cylinder 160 thereabove. The upper ends of the piston elements 172 are exposed to atmospheric pressure through radial ports 174 thereabove in the cylinder 160. The lower ends of the piston elements 172 and the upper ends of the corresponding piston elements 170 are all exposed to the fluid pressure obtaining in an axial passage 176 in the piston rod 162 through radial ports 178 therein. The sum of the areas of the upper ends of the piston elements 170, or the sum of the areas of the lower ends of the piston elements 172, is such as to provide an effective area for the piston means 168 proportional to the tension to be maintained in the corresponding tubing string 26. Again, this construction minimizes the diameter necessary for the hydraulic unit 66 for a given applied fluid pressure, so as to permit minimizing the spacings between the tubing string 26 and the tubing strings 24 and 28 .

Since, in the construction illustrated, the tubing strings 26 and 28 are the same size, the hydraulic unit 68 is identical to the hydraulic unit 66. Since the tubing string 24 is larger, the hydraulic unit 64 may differ from the hydraulic unit 68 in having but a single piston element 180 acting against a single piston element 182, the area of these elements being proportional to the tension in the tubing string 24. (However, multiple piston elements are used wherever necessary to obtain the desired small diameter for the hydraulic unit 64.) The piston element 180 is carried by a piston rod 184 and the piston element 182 is carried by a cylinder 186, the piston rod being connected to the block 164 in the same manner as the piston rod 162, and the cylinder 186 being connected to the wire line 74. The piston rod 184 is provided with an axial passage 188 communicating with the upper end of the piston element 180 through radial ports 190.

Figure 2:
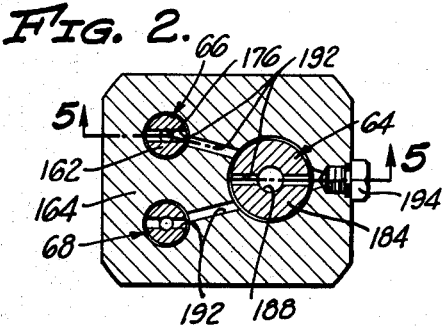
Figure 3:
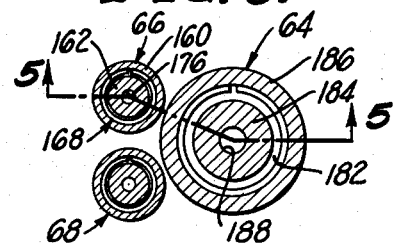
Figure 4:
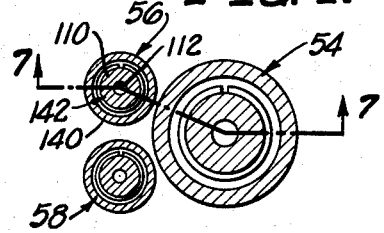

The axial passages 176 and 188 in the piston rods 162 and 184, and the corresponding axial passage in the corresponding piston rod of the hydraulic unit 68, are all interconnected in fluid communication by ports in these rods and a passage system in the block 164 which is designated generally in FIGS. 2 and 5 of the drawings by the numeral 192. Fluid may be introduced into the passage system 192 by removing a plug 194 threaded into the block 164.

The effective areas of the piston means of the hydraulic units 64, 66 and 68 are so related as to provide the desired relation between the proportions of the total load supported by the respective tubing strings 24, 26 and 28 with the same fluid pressure applied to the three hydraulic units through the fluid interconnections described. Preferably, the relationship between the effective areas of the piston means of the hydraulic units 64, 66 and 68 is such as to maintain equal tensile stresses in the tubing strings 24, 26 and 28 when they are supported by the tubing grips 44, 46 and 48.

It will be understood that the tubing grips 44, 46 and 48 may be supplied in sizes corresponding to different tubing string inside diameters (the sizes of the hydraulic units 54, 56 and 58 preferably being correspondingly varied), and that the hydraulic units 64, 66 and 68 may also be supplied in sizes corresponding to different tubing string sizes, or, more specifically, different tubing string unit weights. The apparatus 20 may then be made up by selecting the appropriate tubing grips and hydraulic units for the particular tubing strings utilized. Thus, the apparatus may be made up with tubing grips and hydraulic units in various size combinations corresponding to the particular tubing string size combination used. By combining the proper hydraulic units 64, 66 and 68 for a particular combination of tubing strings, equal tensile stresses in the tubing strings automatically result.

It is thought that the over-all operation of the apparatus 20 will be clear so that only a brief description is necessary. Such brief description will be based on the assumption that the apparatus 20 is in the condition shown in FIG. 1 of the drawings and that additional tubing string sections, not shown, are to be coupled onto the tubing strings 24, 26 and 28 in the course of running the tubing system 22 into the well.

Under the conditions just outlined, the tubing system 22 is supported by the slip means 40, whereupon the tubing grips 44, 46 and 48 for the tubing strings 24, 26 and 28 may be released and withdrawn. By elevating the traveling suspension means 80, the tubing grips may be elevated into positions wherein they may be stabbed into the upper ends of the tubing string sections to be coupled onto the upper ends of the tubing strings 24, 26 and 28, assuming that such tubing string sections are stacked in stands in a derrick. Otherwise, the tubing grips may be stabbed into the ends of tubing string sections stacked in horizontal racks at ground level.

In either event, the tubing grips may be pressurized sufficiently to pick up the additional tubing string sections so that they may be maneuvered into coupling positions by the traveling suspension means 80. The additional tubing string sections are then coupled onto the respective tubing strings 24, 26 and 28 either by threading in the conventional manner, or in the manner disclosed in the aforementioned copending application. If rotation of the added tubing string sections is required during coupling thereof, the tubing grips may be released to prevent twisting of the apparatus 20.

After the additional tubing string sections have been coupled onto the upper ends of the tubing strings 24, 26 and 28, the tubing grips 44, 46 and 48 and the hydraulic units 54, 56 and 58 are energized in the manner hereinbefore described, the traveling suspension means 80 being elevated into a position such as to take up any slack in the apparatus 20 so that the hydraulic units 54, 56 and 58 and the hydraulic units 64, 66 and 68 may function properly. The foregoing procedure results in setting of the tubing grips 44, 46 and 48 in the upper ends of the lengthened tubing strings 24, 26 and 28. The pressures in the tubing grips 44, 46 and 48 and in the hydraulic units 54, 56 and 58 build up to values proportional to the respective loads carried by the tubing grips 44, 46 and 48, and the hydraulic units 64, 66 and 68 tension the respective lengthened tubing strings 24, 26 and 28 in proportion to the weights thereof so as to produce substantially equal tensile stresses in these tubing strings.

The foregoing procedure has the effect of taking the weight of the tubing system 22 off the slip means 40 and transferring it to the tubing grips, and associated hydraulic units whereupon the slip assembly 90 may be removed. If desired, the traveling suspension means 80 may be elevated to facilitate removal of the slip assembly 90. The traveling suspension means 80 is then lowered to lower the tubing system 22 in the well until the staggered upper ends of the tubing strings 24, 26 and 28 are just above the slip means 40. Thereupon, the slip assembly 90 may be reapplied to the tubing strings 24, 26 and 28 and seated in the head 86 to transfer the weight of the tubing system from the tubing grips to the slip means 40. The foregoing procedure may then be repeated.

As will be apparent, a similar, but reversed procedure, is used in running the tubing system 22 out of the well section by section.

Irrespective of whether the tubing system 22 is being run into or out of the well, the desired load distribution among the tubing strings 24, 26 and 28 is maintained at all times. As hereinbefore discussed, such load division is preferably proportional to the respective tubing string weights so that the unit tensile stresses in the tubing strings are substantially equal.

It will be understood that the load distributing means constituted by the hydraulic units 64, 66 and 68 may be used with tubing grips other than the particular tubing grips 44, 46 and 48 disclosed. For example, it may be used with tubing grips having the form of threaded subs threadedly engageable with the tubing strings.

While the slip means 40 shown may, if desired, be utilized to support the tubing system 22 permanently once it has been run all of the way into the well, it will be understood that a suitable permanent slip means, not shown, may be substituted for this purpose.

Obviously, the number of tubing grips and pairs of hydraulic units incorporated in the apparatus 20 will depend on the number of tubing strings incorporated in the tubing system 22, the three-string system hereinbefore described being exemplary only. For example, the same principles can be applied to a two-string system, or to a system of four or more strings. Also, a slip assembly differing from the slip assembly 90 must be substituted for a two-string system, or for a system of four or more strings. A slip assembly 202 suitable for a four-string tubing system 204 is illustrated in FIGS. 14 and 15 of the drawings, and a slip assembly 206 suitable for a two-string tubing system 208 is shown in FIG. 16 of the drawings.

Referring to FIGS. 14 and 15 of the drawings, the tubing system 204 is shown as including two diametrically opposite large tubings 210 and two diametrically opposite small tubings 212 spaced 90° from the large tubings. The slip assembly 202 includes two slips 214 pivotally inter-connected at 216 and engageable with one of the large tubings 210 and respectively engageable with the small tubings 212. Handles 218 are connected to the respective slips 214 by pivots 220, and slips 222 are connected to the inner ends of the respective handles by pivots 224. The slips 222 are respectively engageable with the small tubings 212 and both are engageable with the other of the large tubings 210. The handles 218 are provided with pins 226 which extend into enlarged sockets, not shown, in the slips 222 to limit pivoting of these slips relative to the handles. A fifth, separate slip 228 is insertable between and engageable with all of the tubings 210 and 212 and has connected thereto a wire line 230 by means of which it may be withdrawn from the upper end of the bundle of tubing strings. As will be apparent, it may be necessary to spring the tubing strings 210 and 212 apart slightly as this is done in order to get the slip 228 past the couplings in the tubing strings.

Referring to FIG. 16 of the drawings, the tubing system 208 illustrated therein includes a large tubing 232 and a small tubing 234. The slip assembly 206 for the tubing system 208 is very similar to the slip assembly 90. Consequently, the components of the slip assembly 206 are identified by numerals higher by two hundred than the numerals utilized to identify the corresponding components of the slip assembly 90. The principal difference resides in the configurations of the slips 296 and 300, all three of these engaging the small tubing 234. Otherwise, the structure and operation of the slip assembly 206 are similar to those of the slip assembly 90 so that a further description is not necessary.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:
1. In an apparatus for running into or out of a well a tubing system including tubing strings which are in side-by-side relation, which are interconnected at their lower ends, and each of which carries a part of the weight of the tubing system, the combination of:
  (a) tubing gripping uniits including tubing grips respectively engageable with the tubing strings adjacent the upper ends thereof;
  (b) weight distributing means for applying upward forces to said tubing gripping units in a predetermined relation so as to distribute the weight of the tubing system between the tubing strings in a predetermined relation;
  (c) said weight distributing means including hydraulic weight distributing units comprising hydraulically interconnected cylinders provided with pistons having effective areas with a predetermined relation therebetween;
  (d) said weight distributing units being disposed above and at least substantially in axial alignment wtih said tubing gripping units, respectively;
  (e) means for supporting said weight distributing units; and
  (f) connecting means interconnecting said tubing gripping units and said weight distributing units, respectively.

2. In an apparatus for running into or out of a well a tubing system including tubing strings which are in side-by-side relation, which are interconnected at their lower ends, and each of which carries a part of the weight of the tubing system, the combination of:
  (a) tubing gripping units including hydraulically-radially-expansible tubing grips respectively axially insertable into the tubing strings adjacent the upper ends thereof;
  (b) weight distributing means for applying upward forces to said tubing gripping units in a predetermined relation so as to distribute the weight of the tubing system between the tubing strings in a predetermined relation;
  (c) said weight distributing means including hydraulic weight distributing units comprising hydraulically interconnected cylinders provided with pistons having effective areas with a predetermined relation therebetween;
  (d) said weight distributing units being disposed above and at least substantially in axial alignment with said tubing gripping units, respectively;
  (e) means for supporting said weight distributing units; and
  (f) connecting means interconnecting said tubing gripping units and said weight distributing units, respectively.

3. In an apparatus for running into or out of a well a tubing system including tubing strings which are in side-by-side relation, which are interconnected at their lower ends, and each of which carries a part of the weight of the tubing system, the combination of:
  (a) tubing gripping units including hydraulically-radially-expansible tubing grips respectively axially insertable into the tubing strings adjacent the upper ends thereof;
  (b) said tubing gripping units respectively including hydraulic setting units which comprise means for applying hydraulic pressures to said tubing grips proportional to the weights carried by said tubing gripping units;
  (c) weight distributing means for applying upward forces to said tubing gripping units in a predetermined relation so as to distribute the weight of the tubing system between the tubing strings in a predetermined relation;
  (d) said weight distributing means including hydraulic weight distributing units comprising hydraulically interconnected cylinders provided with pistons having effective areas with a predetermined relation therebetween;
  (e) said weight distributing units being disposed above and at least substantially in axial alignment with said tubing gripping units, respectively;
  (f) means for supporting said weight distributing units; and
  (g) connecting means interconnecting said tubing gripping units and said weight distributing units, respectively.

4. In an apparatus for running into or out of a well a tubing system including tubing strings which are in side-by-side relation, which are interconnected at their lower ends, and each of which carries a part of the weight of the tubing system, the combination of:
  (a) tubing gripping units including hydraulically-radially-expansible tubing grips respectively axially insertable into the tubing strings adjacent the upper ends thereof;
  (b) weight distributing means for applying upward forces to said tubing gripping units in a predetermined relation so as to distribute the weight of the tubing system between the tubing strings in a predetermined relation;
  (c) said weight distributing means including hydraulic weight distributing units comprising hydraulically interconnected cylinders provided with pistons having effective areas with a predetermined relation therebetween;
  (d) said weight distributing units being disposed above and at least substantially in axial alignment with said tubing gripping units, respectively;
  (e) means for supporting said weight distributing units;
  (f) connecting means interconnecting said tubing gripping units and said weight distributing units, respectively; and
  (g) said weight distributing units being detachably connected to said supporting means to permit the substitution of other weight distributing and tubing gripping units to change the relation between the upward forces applied to the tubing strings.

5. In an apparatus for running into or out of a well a tubing system including tubing strings which are in side-by-side relation, which are interconnected at their lower ends, and each of which carries a part of the weight of the tubing system, the combination of:
  (a) tubing gripping units including hydraulically-radially-expansible tubing grips respectively axially insertable into the tubing strings adjacent the upper ends thereof;
  (b) weight distributing means for applying upward forces to said tubing gripping units in a predetermined relation so as to distribute the weight of the tubing system between the tubing strings in a predetermined relation;
  (c) said weight distributing means including hydraulic weight distributing units comprising hydraulically interconnected cylinders provided with pistons having effective areas with a predetermined relation therebetween;
  (d) said weight distributing units being disposed above and at least substantially in axial alignment with said tubing gripping units, respectively;
  (e) means for supporting said weight distributing units; and
  (f) elongated, flexible connecting means extending between and interconnecting said tubing gripping units and said weight distributing units, respectively.

6. In an apparatus for running into or out of a well a tubing system including tubing strings which are in side-by-side relation, which are interconnected at their lower ends, and each of which carries a part of the weight of the tubing system, the combination of:
  (a) tubing gripping units including hydraulically-radially-expansible tubing grips respectively axially insertable into the tubing strings adjacent the upper ends thereof;
(b) weight distributing means for applying upward forces to said tubing gripping units in a predetermined relation so as to distribute the weight of the tubing system between the tubing strings in a predetermined relation;
(c) said weight distributing means including hydraulic weight distributing units comprising hydraulically interconnected cylinders provided with pistons having effective areas with a predetermined relation therebetween;
(d) the piston of at least one of said weight distributing units including at least two piston elements structurally connected in tandem and hydraulically connected in parallel to limit the outside diameter of such weight distributing unit to the same order of magnitude as the outside diameter of the corresponding tubing string;
(e) said weight distributing units being disposed above and at least substantially in axial alignment with said tubing gripping units, respectively;
(f) means for supporting said weight distributing units; and
(g) connecting means extending between and interconnecting said tubing gripping units and said weight distributing units, respectively.

References Cited by the Examiner
UNITED STATES PATENTS

| | | | |
|---|---|---|---|
| 2,188,589 | 1/40 | Armentrout | 166—47 |
| 2,290,409 | 7/42 | Cuthill | 294—86.24 |
| 2,610,691 | 9/52 | Berry | 166—49 |
| 2,621,867 | 12/52 | Grettve | 29—252 |
| 2,708,975 | 5/55 | Schaefer | 166—75 |
| 2,721,614 | 10/55 | Simmons | 166—77 |
| 2,758,654 | 8/56 | Simmons | 166—49 |
| 2,763,327 | 9/56 | Ransom | 166—98 |
| 2,791,277 | 5/57 | Ilfrey et al. | 166—45 |
| 2,806,534 | 9/57 | Potts | 166—98 |
| 2,939,533 | 6/60 | Coberly | 166—46 |
| 2,970,445 | 2/61 | Suderow | 254—106 |
| 2,970,651 | 2/61 | Roberts | 166—212 |
| 3,011,552 | 12/61 | Rhodes et al. | 166—89 |
| 3,090,598 | 5/63 | Paul | 254—29 |

CHARLES E. O'CONNELL, *Primary Examiner.*
BENJAMIN BENDETT, *Examiner.*